(12) United States Patent
Sparks

(10) Patent No.: US 9,573,224 B2
(45) Date of Patent: Feb. 21, 2017

(54) SYSTEM AND METHOD FOR DETERMINING BEAM POWER LEVEL ALONG AN ADDITIVE DEPOSITION PATH

(71) Applicant: Product Innovation & Engineering, LLC, Saint James, MO (US)

(72) Inventor: Todd Eugene Sparks, Rolla, MO (US)

(73) Assignee: Product Innovation & Engineering, LLC, St. James Industrial Park, Rolla, MO (US)

( * ) Notice: Subject to any disclaimer, the term of this patent is extended or adjusted under 35 U.S.C. 154(b) by 354 days.

(21) Appl. No.: 14/474,993

(22) Filed: Sep. 2, 2014

(65) Prior Publication Data
US 2016/0059352 A1    Mar. 3, 2016

(51) Int. Cl.
*B23K 26/03* (2006.01)
*B23K 26/34* (2014.01)
(Continued)

(52) U.S. Cl.
CPC ........... *B23K 26/345* (2013.01); *B22F 3/1055* (2013.01); *B23K 26/034* (2013.01); *B33Y 10/00* (2014.12);
(Continued)

(58) Field of Classification Search
CPC ......... B33Y 10/00; B33Y 50/00; B33Y 50/02; B23K 26/034; B23K 26/0626; B23K 26/342
See application file for complete search history.

(56) References Cited

U.S. PATENT DOCUMENTS

| 4,817,020 A | 3/1989 | Chande |
| 4,959,244 A | 9/1990 | Penny |
| (Continued) | | |

FOREIGN PATENT DOCUMENTS

| DE | 4234339 | 6/2002 |
| DE | 102010015023 | 10/2011 |
| (Continued) | | |

OTHER PUBLICATIONS

B. Dutta, Rapid manufacturing and remanufacturing of DoD components using direct metal deposition, Published in: The AMMTIAC Quarterly, vol. 6, No. 2, p. 5.

(Continued)

*Primary Examiner* — Ryan Reis
(74) *Attorney, Agent, or Firm* — Don V. Kelly; Evans & Dixon, L.L.C.

(57) ABSTRACT

A power schedule calculation method utilizes an idealized geometry to predict laser power levels on an additive path during laser deposition. The method calculates beam power for any point along the path traveled to form a build having a geometry. Each point along the path has associated with it an idealized geometry comprising a melt pool, hot zone and bulk portion. The method comprises creating a geometric description representing the geometry of the build during the process, creating a path description representing the path of the beam source through space during the process, calculating the idealized geometry for the point on the path based upon the geometric description and path description, calculating an energy balance at the melt pool for the point on the path, calculating total energy needed at the point on the path and calculating optimum beam source power. In the calcu- (Continued)

lations, build temperature is based upon a calculation of hot zone temperature derived from the idealized geometry.

**6 Claims, 13 Drawing Sheets
(3 of 13 Drawing Sheet(s) Filed in Color)**

(51) Int. Cl.
| | |
|---|---|
| *B33Y 30/00* | (2015.01) |
| *B33Y 10/00* | (2015.01) |
| *B33Y 50/02* | (2015.01) |
| *B33Y 50/00* | (2015.01) |
| *B22F 3/105* | (2006.01) |

(52) U.S. Cl.
CPC ............... *B33Y 30/00* (2014.12); *B33Y 50/00* (2014.12); *B33Y 50/02* (2014.12)

(56) References Cited

U.S. PATENT DOCUMENTS

| | | | |
|---|---|---|---|
| 5,155,329 | A | 10/1992 | Terada |
| 5,247,155 | A | 9/1993 | Steen |
| 5,283,416 | A | 2/1994 | Shirk |
| 5,334,191 | A | 8/1994 | Poppa |
| 5,449,882 | A | 9/1995 | Black |
| 5,517,420 | A | 5/1996 | Kinsman |
| 5,651,903 | A | 7/1997 | Shirk |
| 5,674,415 | A | 10/1997 | Leong |
| 5,854,751 | A | 12/1998 | DiPietro |
| 6,122,564 | A | 9/2000 | Koch |
| 6,188,041 | B1 | 2/2001 | Kim |
| 6,311,099 | B1 | 10/2001 | Jasper |
| 6,780,657 | B2 | 8/2004 | Ino |
| 6,809,820 | B2 | 10/2004 | Snelling |
| 6,813,533 | B1* | 11/2004 | Semak ............... B23K 26/34 148/97 |
| 6,995,334 | B1 | 2/2006 | Kovacevic |
| 7,186,947 | B2 | 3/2007 | Connally |
| 8,426,770 | B2 | 4/2013 | Pinon |
| 8,777,482 | B2 | 7/2014 | Pfitzner |
| 2006/0032840 | A1 | 2/2006 | Bagavath-Singh |
| 2006/0249487 | A1 | 11/2006 | Dunias |
| 2007/0179484 | A1 | 8/2007 | Sade |
| 2008/0029495 | A1* | 2/2008 | Emiljanow ............ B23K 26/03 219/121.61 |
| 2008/0296270 | A1 | 12/2008 | Song |
| 2009/0206065 | A1* | 8/2009 | Kruth .................... B22F 3/1055 219/121.66 |
| 2009/0255980 | A1 | 10/2009 | Li |
| 2009/0283501 | A1 | 11/2009 | Erikson |
| 2010/0134628 | A1* | 6/2010 | Pfitzner .................. B23K 26/03 348/159 |
| 2011/0100964 | A1 | 5/2011 | Burbaum |
| 2013/0062324 | A1 | 3/2013 | Dorsch |
| 2013/0066403 | A1 | 3/2013 | Giraud |
| 2013/0168902 | A1 | 7/2013 | Herzog |
| 2013/0319580 | A1 | 12/2013 | Ozbaysal |
| 2014/0034626 | A1* | 2/2014 | Illston ................. B29C 67/0077 219/121.78 |
| 2014/0306380 | A1* | 10/2014 | El-Siblani ........... B29C 67/0088 264/401 |
| 2015/0268099 | A1 | 9/2015 | Craig |

FOREIGN PATENT DOCUMENTS

| | | |
|---|---|---|
| DE | 102010039442 | 2/2012 |
| EP | 1340583 | 3/2003 |
| EP | 1958584 | 8/2008 |
| EP | 1099184 | 1/2014 |
| EP | 1693141 | 2/2014 |
| WO | WO 00/76715 | 12/2000 |

OTHER PUBLICATIONS

S. Cohen, A model for the reflectivity in laser-substrate interactions, Source: Journal of Applied Physics, v 64, n 10, pt.1, 5102-5, Nov. 15, 1988; Country of publication: USA.

Z. Ye, Real-time measure system of molten pool temperature field in laser remanufacturing, Published in: Lasers & Electro Optics & The Pacific Rim Conference on Lasers and Electro-Optics, 2009. CLEO/Pacific Rim '09. Conference on Date of Conference: Aug. 3-30, 2009pp. 1-2E.

R. Fabbro, Study of keyhole geometry for full penetration Nd-Yag CW laser welding, Published in: Lasers and Electro-Optics Europe, 2005. CLEO/Europe. 2005 Conference on Date of Conference: Jun. 17-17, 2005 pp. 659.

Govardhan, S.M, Real-time welding process control using infrared sensing, Thermal, Mechanical and Multi-Physics Simulation and Experiments in Microelectronics and Microsystems (EuroSimE), 2013 14th International Conference on Apr. 14-17, 2013 pp. 1-5.

Toshinari, O., Measurement of TIG weld pool surface temperature distribution by UV radiation thermometry, Published in: SICE 2002, Proceedings of the 41st SICE Annual Conference (vol. 1 )Date of Conference: Aug. 5-7, 2002 pp. 39-41 vol. 1.

Dutta, B., Additive manufacturing by direct metal deposition, Published in: Advanced Materials & Processes, Date: May 2011.

Heralic, Almir, Monitoring and Control of Robotized Laser Metal-Wire Deposition, Department of Signals and Systems Chalmers University of Technology, Goteborg, Sweden 2012; Department of Engineering Science University West Trollhattan, Sweden 2012.

Craeghs, Online Quality Control of Selective Laser Melting, Katholieke Universiteit Leuven, Departement of Mechanical Engineering, Celestijnenlaan 300B, 3001 Haverlee (Belgium) 2011.

Barua, Development of a Low Cost Imaging System for a Laser Metal Deposition Process, Department of Manufacturing Engineering, Missouri University of Science and Technology.

Office Action dated Aug. 12, 2016 cited in co-pending U.S. Appl. No. 14/558,306.

* cited by examiner

MACHINE ENVIRONMENT

SYSTEM AND METHOD FOR DETERMINING BEAM POWER LEVEL ALONG AN ADDITIVE DEPOSITION PATH

CROSS REFERENCE TO RELATED APPLICATION

Not applicable.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates to additive metal layering techniques using an emitted energy source.

BACKGROUND OF THE INVENTION

Additive metal deposition is an industrial technique that builds fully-dense structures by melting powdered or wire metal, via a laser or other energy source, into solidifying beads, which are deposited side by side and layer upon layer upon a work piece substrate. It is known to utilize the process to repair and rebuild a worn or damaged component using a laser to build up structure on the component. The process is particularly useful to add features such as bosses or flanges on subcomponents of fabricated structures. The basic process involves adding layers to the component to create a surface feature on the component via the introduction of depositing material (delivered in the form of injected powder or a wire) into a laser beam. The additive process is known by several names including "laser cladding," "laser metal deposition," "direct metal deposition" or "additive metal layering."

Additive metal layering is typically performed by using a computer aided design ("CAD") to map the geometry of a part and then depositing metal, layer-by-layer, on the part. The CAD mapped geometry is input into a computer controlled (robotic) part handler that can manipulate the part in multiple axes of movement during the deposition process. In all of these techniques a heat source (typically an industrial laser beam) is used to create a melt pool into which a wire or powdered feedstock is fed in order to create beads upon solidification. In practice, the heat source is under computer numerical control and is focused onto a workpiece, producing the melt pool. A small amount of powder or wire metal is introduced into the melt pool, building up the part in a thin layer. The beam follows a previously determined toolpath. The toolpath is generated based on the CAD data that computes the needed part layer by layer. The beads are created by means of relative motion of the melt pool and the substrate, e.g. using an industrial robot arm or an XY-table. A part is then built by depositing the beads side by side and layer upon layer. The most popular approach combines a high power laser heat source with metal powder as the additive material.

Careful tuning of the deposition tool and parameters, such as the powder or wire feed rate, the energy input, and the traverse speed are therefore important in order to obtain layers, which are free from defects such as shape irregularities, lack-of-fusion or cracks. Droplet forming, i.e. globular transfer of the molten metal, is also a common disturbance that affects the geometrical profile of the deposited beads and stability of the additive layers.

Regulating the necessary needed power is critical to system operation and achieving a high-quality layered end product. The currently known laser additive processes attempt to address deposition quality issues in either of two ways. In this respect, the prior laser additive processes use a constant laser power or one regulated by a feedback (a/k/a "closed-loop") sensor.

The issue with using a constant laser power is that the operator has to optimize the power level for a worst case scenario, typically the start of the process. This results in variations in both geometry and material properties as the melt pool size and temperature gradients vary with the local energy balance conditions around the melt pool. Using a constant energy throughout the deposition process is problematic because the additive process changes the geometry of the built structure during the process. Hence, the chosen constant power level represents a compromise selection. For example and as shown in FIG. 1A, at the start of the deposition process, the structure is positioned further from the laser source and too little energy is input into the deposition. At the mid-process point, shown in FIG. 1B, the target structure is closer to the energy source and the appropriate energy is present in the workpiece. However, by the end of the process, as shown, in FIG. 1C, the workpiece is closer to the energy source and too much energy is present in the work site.

Feedback systems represent an attempt to address the deficits of the constant power system. The typical prior art feedback systems attempt to control the deposition process by monitoring the dimensions of the part or the melt pool during the deposition process. Feedback or closed-loop systems are inherently reactionary, and thus can only react to conditions that have already drifted away from nominal. There is thus a need in the art for an improved method of regulating laser power during the additive process.

SUMMARY OF THE INVENTION

The instant invention addresses the deficits of the prior art by providing for a method of predicting needed laser power during an additive layer process. The calculated predictive levels can then be input into the laser power controller to regulate laser power at intervals during the additive path deposition process. The inventive method is a power schedule calculation method for an additive deposition process using a beam source that calculates optimum beam power for any point P(s) along an additive path that will be traveled to form a build that has a geometry and is formed from deposited material added to a substrate. The inventive method utilizes a calculated idealized geometry for each point P(s) along the additive path. The idealized geometry for each point P(s) comprises a melt pool, hot zone and bulk portion. FIG. 2 is a photograph depicting a real-world machine environment of a substrate undergoing additive metal layering. This image shows the thermodynamic constituents of the workpiece used to formulate an idealized geometry. As shown in FIG. 2 an idealized geometry of the present invention comprises the melt pool, hot zone and bulk structure, which are delineated in the photograph. The pink arrow indicates heat flux entering the environment. The red arrows indicate heat conduction in the workpiece. The blue arrows represent heat lost by the workpiece to the environment.

The inventive method predicts energy needs along the additive path based upon an improved model of the dynamic geometry and thermodynamics of the build during the additive process. The inventive laser power prediction method can be generally described as using four essential components to calculate needed power during the deposition process to create a thermodynamic model of the deposition system. The four components include:
 a) an additive path describing the path of the laser through space;
 b) a geometric representation of the geometry that the additive path is intended to create;
 c) a description of the thermodynamic characteristics of the manufacturing environment; and
 d) the thermophysical characteristics of the materials involved.

The inventive model is used to predict an appropriate input laser power at definable intervals along the laser path. It accomplishes this by using the path and geometric representation of the part being produced to create an idealized geometry that allows for tenable calculations. As shown in FIG. 2, the Idealized geometry comprises three elements: the melt pool, a hot zone around the melt pool, and the rest of the component being constructed. Prior art predictive and feedback systems and methods rely on melt pool characteristics for predictive and feedback control. In contrast, a key element in the model used in the present invention is the hot zone. In particular, the present invention method and system relies upon a good estimator of the hot zone shape and connectivity to the bulk of the structure. Estimating the hot zone is accomplished by intersecting hemispheres oriented in the direction of the tool axis with the part geometry. This technique is shown in FIG. 3.

The model's advantage over a more conventional Eulerian finite element method ("FEM") mode is demonstrated in FIGS. 4A and 4B. As shown in these figures, the number of calculations (represented by the arrows) necessary to compute the heat conduction through the domain in the inventive model is less than the conventional Eulerian FEM model. Applying the domain-specific knowledge to create the simplified model for predicting laser power allows for the computation of laser power with higher frequency and good numerical stability.

The present invention also includes a system for fabricating a part on a substrate using a deposition beam source that follows an additive path and that is controlled in accordance with the described laser power prediction method. The system includes a computer-aided design database including a description of the part to be fabricated and a database describing the additive path to be traveled as the part is formed. The additive path is composed of a plurality of points. The system further includes a substrate support for supporting the substrate and manipulating it through space, a metal stock delivery system, (e.g., powdered metal injector/sprayer or wire feed) and a controllable beam source capable of emitting a beam onto the substrate and adapted to form a melt pool thereon and a controller adapted to control power to the beam source. The controller is programmed to regulate energy of the produced beam for any point on the additive path in accordance with the required power predicted for that point by the described calculation methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present invention is directed to a laser power prediction method. The method utilizes the following items to create an improved thermodynamic model of the work piece to compute needed laser power at Intervals during the additive process. The method does so using: a) an additive path describing the path of the laser through space; b) a geometric representation of the geometry that the additive path is intended to create; c) a description of the thermodynamic characteristics of the manufacturing environment; and d) computed thermophysical characteristics of the materials involved. This model is used to predict an appropriate input laser power at definable intervals along the laser path. It accomplishes this by using the path and geometric representation of the part being produced to create an idealized geometry that allows for tenable calculations.

Figure 1A:
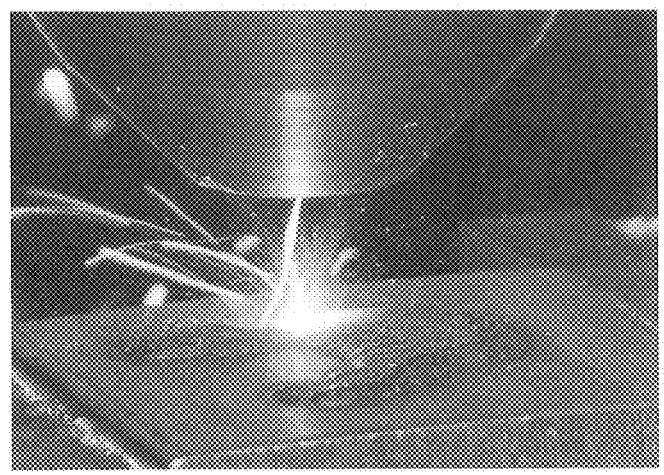
FIGS. 1A-1C are photographs showing the beginning, middle and end stages of an additive build process utilizing a constant power to form a build.
Figure 1B:
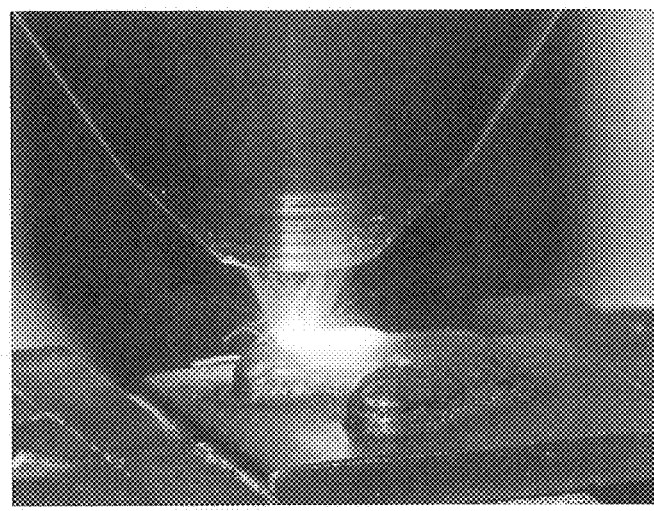
Figure 1C:
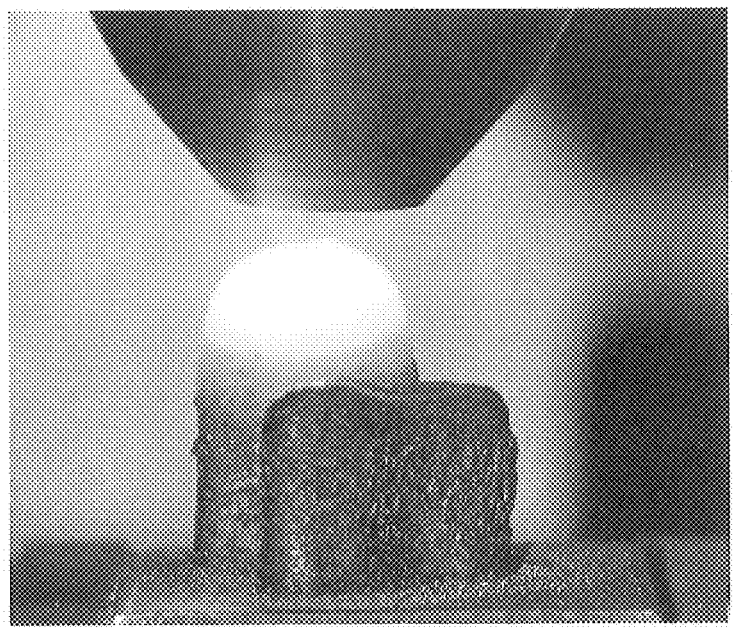
Figure 2:
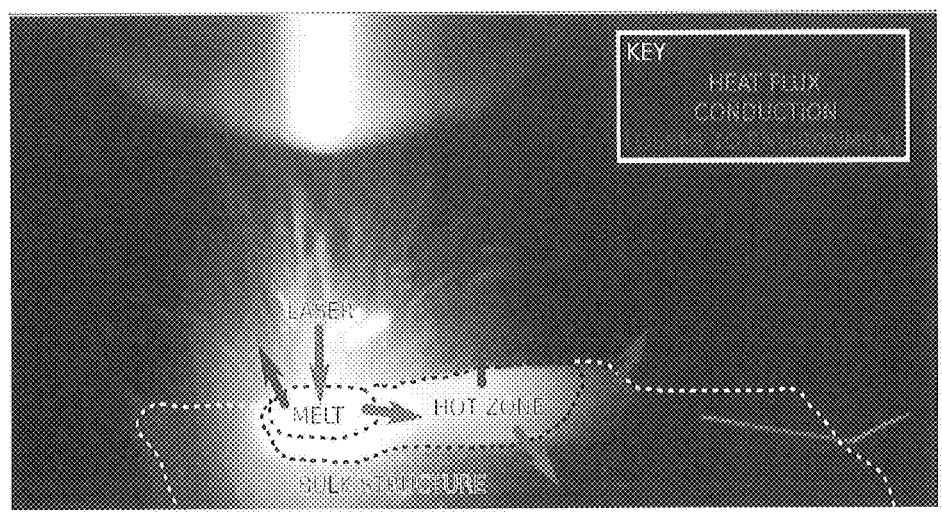
FIG. 2 is a photograph of a substrate undergoing additive metal layering showing the thermodynamic constituents of the workpiece used to formulate an idealized geometry of the present invention.
Figure 3:
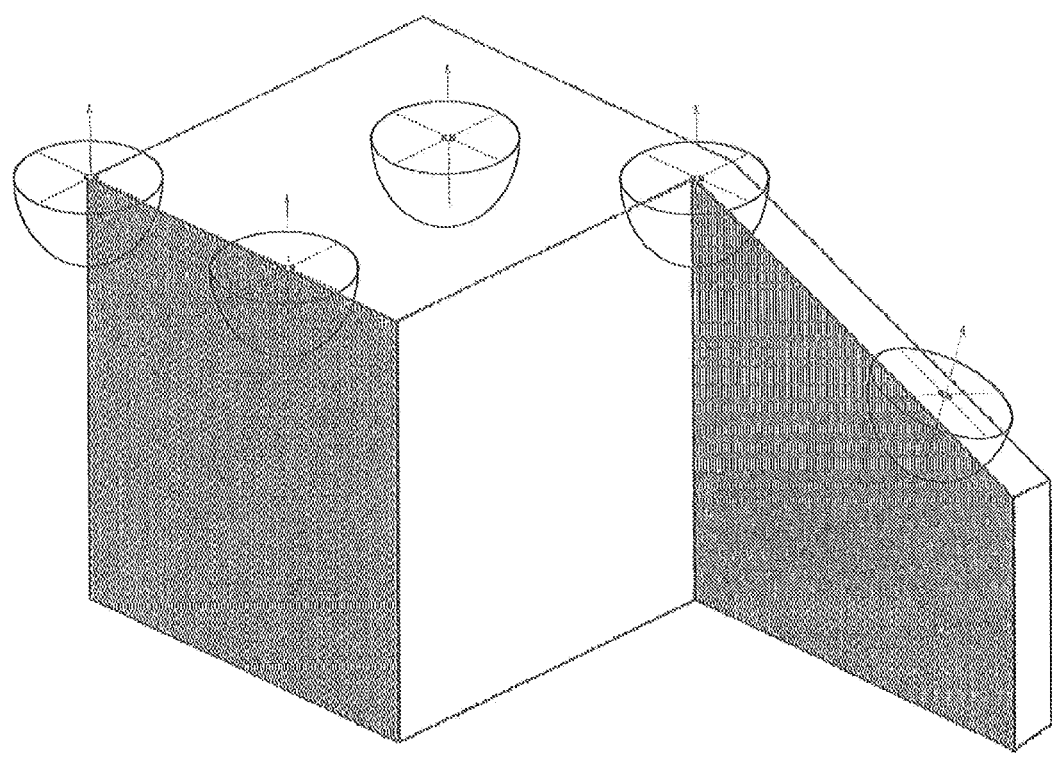
FIG. 3 is a diagram showing the hemisphere oriented technique used to estimate hot zone shape and connectivity of the bulk of the workpiece structure.
Figure 4A:
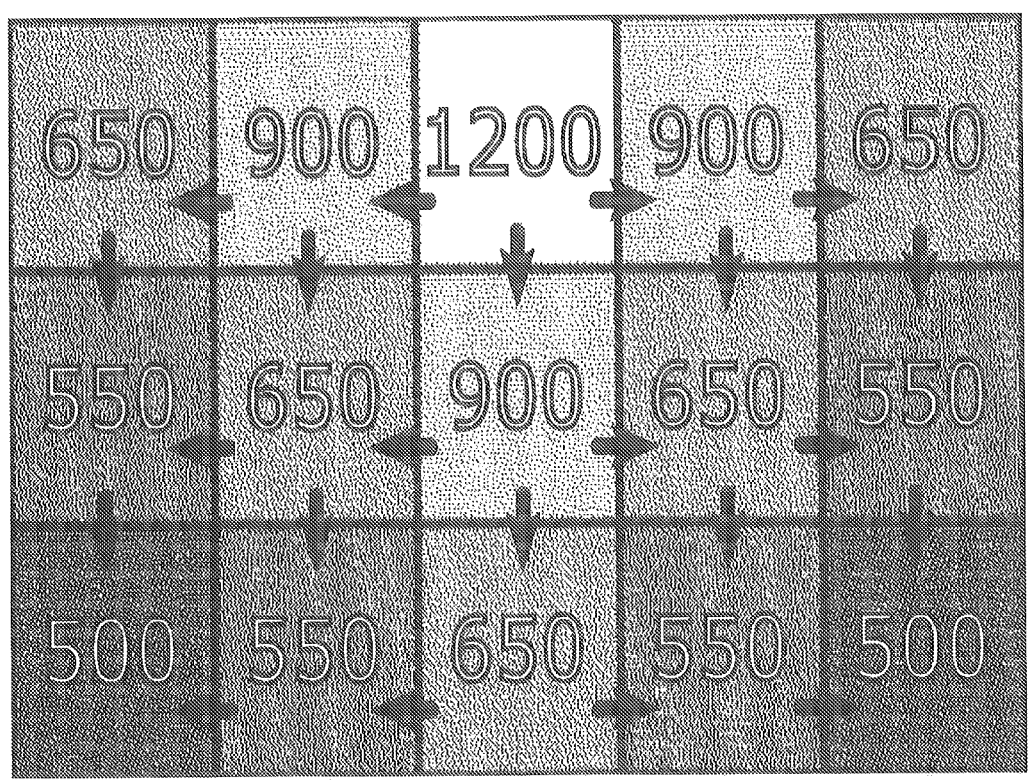
FIG. 4A depicts the conventional Eulerlan FEM model used to estimate heat conduction through a structure.
Figure 4B:
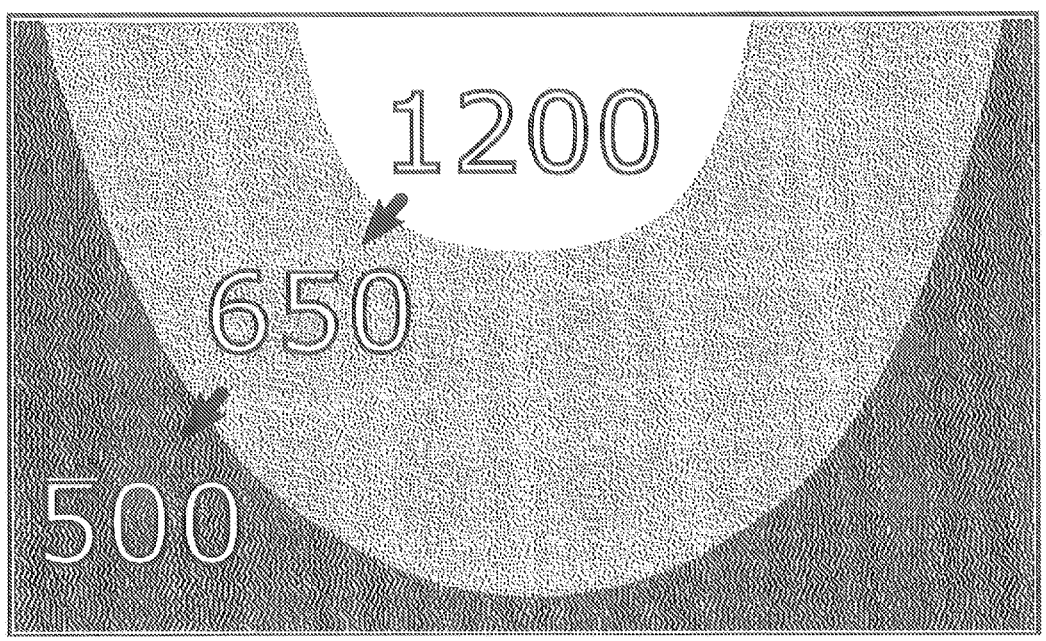
FIG. 4B depicts the simplified method used to estimate heat conduction through a structure that is employed as part of the present invention predictive method.

As shown in FIG. 2, a workplace undergoing additive laser deposition includes various regions that respond to input beam energy. These regions are utilized to create an idealized geometry for a thermodynamic model. As shown in FIG. 2 workpiece subject to laser impact comprises:
 a. A molten puddle (melt pool);
 b. A region of hot material in direct contact with the molten puddle (hot zone); and c. A mass representing the substrate material and part geometry not represented by the other two regions (bulk).

The laser power input is calculated by performing an energy balance calculation at intervals along the laser's path with the following considerations:
1. Conduction from the melt pool to the hot zone;
2. Conduction from the hot zone to the bulk of the particular workpiece;
3. Conduction from the bulk of the part to the clamping system of the CNC machine;
4. Radiation from the melt pool;
5. Radiation from the hot zone;
6. Convection from the melt pool;
7. Convection from the hot zone;
8. Convection from the bulk structure;
9. Process activity at the current point (i.e. is the laser supposed to be on now or not?);
10. Mass of the hot zone; and
11. Area for conduction between the hot zone and bulk structure.

Relevant to describing and demonstrating the inventive method are the following elements and symbols, which have the meanings indicated.

Material Properties
Specific heat, $C_p$
Thermal conductivity, k
Density, $\rho$
Laser absorption coefficient, $\alpha$
Liquidus temperature, $T_l$
Emissivity, $\epsilon$
heat of fusion, $H_f$
heat of the build, $H_{build}$
mass of the build, $m_{build}$
mass of the substrate, $m_{sub}$
temperature of the build, $T_{build}$
ambient temperature, $T_{amb}$
temperature of the hot zone, $T_{hot}$
point on the path, s
Machine Parameters
Maximum laser power, $Q_{max}$
Ambient temperature, $T_{amb}$
Machine temperature, $T_{mach}$
Area for part→machine heat transfer, $A_{mach}$
Powder supply temperature, $T_p$
Convection coefficient for the machine environment, h
Deposition Parameters
Layer thickness, $d_l$
track width, w
Remelt thickness as a fraction of layer thickness, r
Scan speed, $f$
Substrate mass, $m_{sub}$
Desired superheat, $T_{super}$
Laser Predictive Power Settings
Target hot zone radius, $r_{hot}$
Target melt pool temperature, $T_{melt}=T_l+T_{super}$
Target hot zone temperature, $Tt_{arget}$
Laser power prediction interval, $i_p$
Physical Constants
Stefan-Boltzmann constant, $\sigma$
Nomenclature
Let s describe the length along the deposition path.
Let P describe the deposition path such that P(s) is the Cartesian coordinate at a distance of s along the path.
Let $\hat{t}$ (s) describe the tool axis direction at a distance of s along the path.
Let G describe the deposition geometry.
Let Z (r, p, $\hat{n}$) describe a hemisphere of radius r with the circular surface centered at point p with a normal direction of $\hat{n}$.

An exemplary calculation method thus proceeds as follows. First, before beginning the formal calculations representing the in-process thermodynamic environment, initial values are input based upon the starting temperature environment Initialize the energy content of the part:

$$H_{build}=C_p T_{amb} m_{sub} \tag{1}$$

Initialize the mass of the part:

$$m_{build}=m_{sub} \tag{2}$$

Initialize the temperature of the part:

$$T_{build}=T_{amb} \tag{3}$$

Initialize the hot zone temperature:

$$T_{hot}=T_{build} \tag{4}$$

Set the path to begin at the beginning:

$$s=0 \tag{5}$$

Useful constants should be then pre-calculated.
Maximum volume of the hot zone:

$$V_{max}=2/3 r^3_{hot} \pi \tag{6}$$

Maximum, area of the hot zone:

$$A_{max}=2 r^2_{hot} \pi \tag{7}$$

Approximate surface area of the melt pool:

$$A_{melt}=1/4 w^2 \pi \tag{8}$$

Mass per unit length of deposition $$m_{ul}=w d_l \rho \tag{9}$$

Time for the laser to traverse one calculation interval:

$$\Delta t = i_p/f \tag{10}$$

With the above initial pre-calculation steps undertaken, one can proceed to calculate needed laser power along a given deposition path according to the following method.

A. Calculate the geometry index for the current position, $$V_{hot}=G \cap Z(r_{hot}, P(s), \hat{t}(s)) \tag{11}$$

$$A_{hot}=V_{hot} A_{max}/V_{max} \tag{12}$$

B. Compute the energy balance at the melt pool.
1. Energy radiated from the melt pool:

$$H_{rad}=\epsilon \sigma A_{melt}(T^4_{melt}-T^4_{env}) \Delta t \tag{13}$$

2. Energy conducted from the melt pool to the hot zone:

$$H_{cond}=k A_{hot}/r_{hot}(T_{melt}-T_{hot}) \Delta t \tag{14}$$

3. Energy lost due to convection at the melt pool:

$$H_{conv}=h A_{melt}(T_{hot}-T_{env}) \Delta t \tag{15}$$

C. Compute the laser power.
1. Energy required to melt the powder:

$$H_{powder}=m_{ul} i_p((T_{melt}-T_p)C_p+H_f) \tag{16}$$

2. Energy required to remelt the existing material:

$$H_{remelt}=m_{ul} i_p r((T_{melt}-T_{hot})C_p+H_f) \tag{17}$$

3. Total energy required for this step:

$$H_{total}=H_{powder}+H_{remelt}+H_{rad}+H_{cond}+H_{conv} \tag{18}$$

4. Calculate a viable laser power:

$$Q_{laser}=\min(Q_{max}, H_{total}/\alpha \Delta t) \tag{19}$$

D. Update the mass of the build.

$$m_{build} = m_{build} + m_u i_p \quad (20)$$

E. Calculate the energy losses at the build.
1. Estimate an effective radius and area of the build for the purposes of heat transfer calculations:

$$r_{build} = 3\sqrt[3]{3m\text{build}/\rho 4\pi} \quad (21)$$

$$A_{build} = 4r^2_{build}\pi \quad (22)$$

2. Energy radiated from the hot zone:

$$H_{hot} = \epsilon\sigma A_{hot}(T^4_{hot} - T^4_{amb})\Delta t \quad (23)$$

3. Energy conducted from the build to the machine:

$$H_{mach} = (kA^{machine}/r_{build})(T_{build} - T_{much})\Delta t \quad (24)$$

4. Energy lost due to convection to the machine environment:

$$H_{env} = hA_{build}(T_{build} - T_{amb})\Delta t \quad (25)$$

F. Update enthalpy of the build.

$$H_{build} = H_{build} + Q_{laser}\Delta t - H_{mach} - H_{hot}H_{env} \quad (26)$$

G. Update the build temperature.

$$T_{build} = H_{build}/C_p \quad (27)$$

H. Update the hot zone temperature estimate.

$$T_{hot} = (T_{build} + T_{target})/2 \quad (28)$$

I. Update the position along the deposition path.

$$s = s + i_p \quad (29)$$

J. If the path is not complete, return to step 1.

Figure 5A:
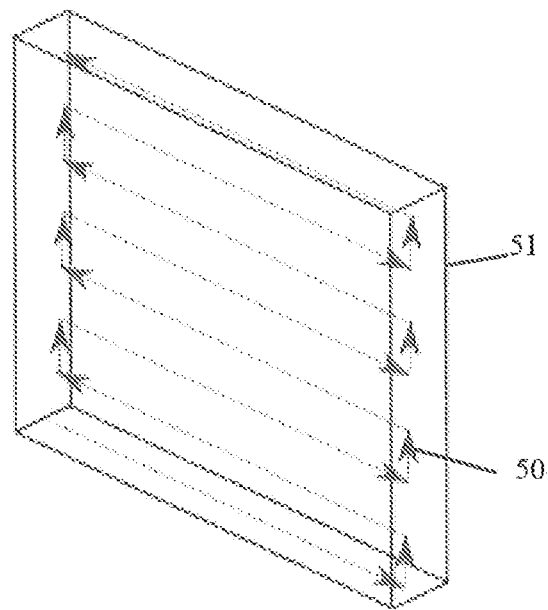
FIG. 5A depicts a simplified deposition path utilized when building a wall-shaped structure using additive laser deposition.
Figure 5B:
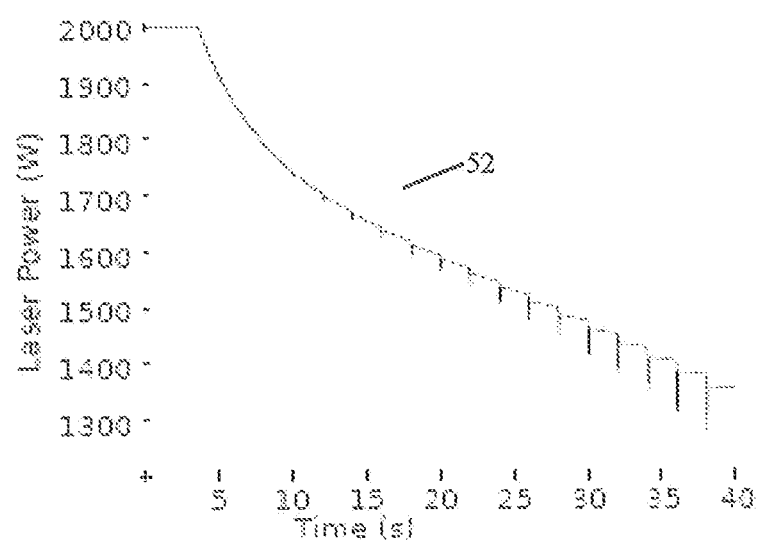
FIG. 5B is a graph showing predicted needed laser power over time for an additive metal deposition process used to build the wall structure of FIG. 5A. The predicted needed laser power is calculated at various intervals along the additive path process according to the present invention calculation technique.

These calculations are carried out in sequence with each result being an input for the next step in the process. For example, during the calculation of a laser power schedule for a 56.5 mm long×3.3 mm wide×190 mm tail rectangular structure (approximately 500 layers, ~20 minutes of real machine time), the laser power prediction algorithm calculated the appropriate laser power for 14502 discrete points along the path. FIG. 5A depicts a simplified deposition path 50 utilized when building a wall-shaped structure 51 using additive laser deposition. FIG. 5B is a graph 52 showing predicted needed laser power over time for an additive metal deposition process used to build the wall structure 51 of FIG. 5A. The periodicity of the predicted laser power shown in FIG. 5A is due to the laser reaching the corners of the wall structure, which reduces the area available for heat transfer away from the melt pool, resulting in less required laser power to maintain the desired energy balance. The predicted needed laser power is calculated at various intervals along the additive path process according to the present invention calculation technique. The computer controlling the laser power can be programmed to adjust laser power along the deposition path in accordance with the predicted levels of needed energy.

Figure 6A:
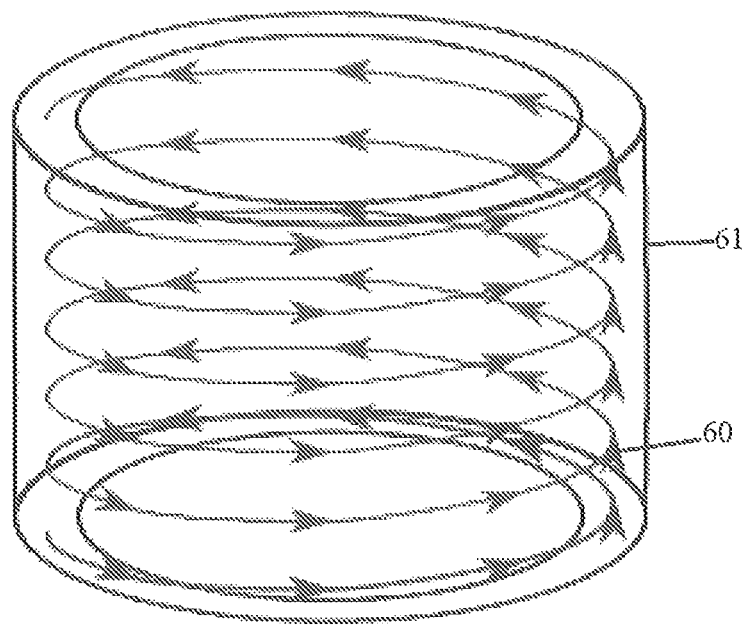
FIG. 6A depicts a simplified deposition path utilized when building a cylindrical-shaped structure using additive laser deposition.
Figure 6B:
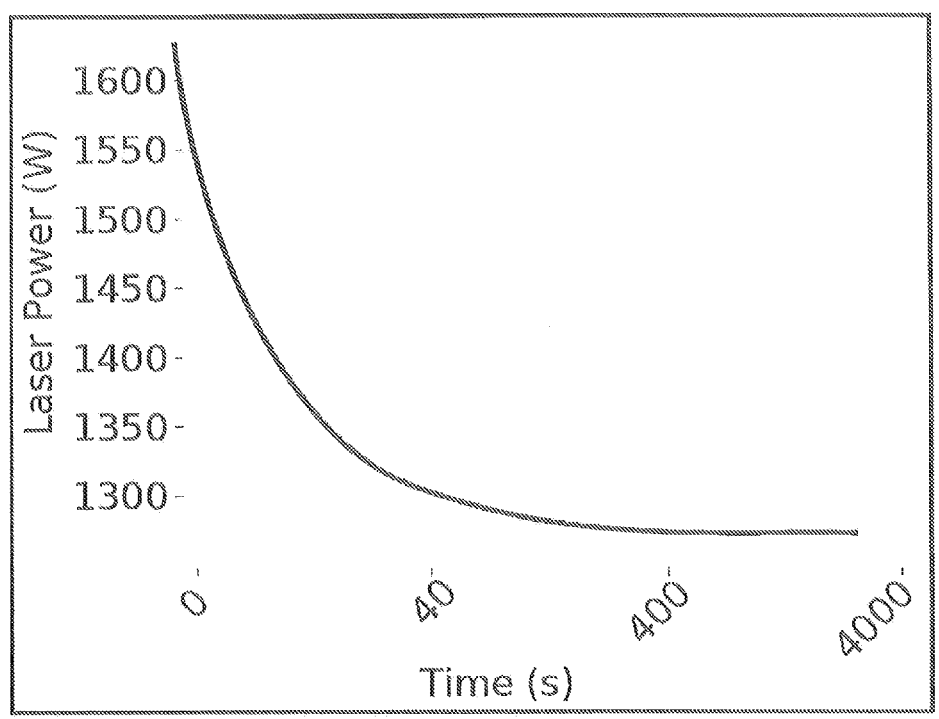
FIG. 6B is a graph showing predicted needed laser power over time for an additive metal deposition process used to build the cylindrical structure of FIG. 6A. The predicted needed laser power is calculated at various intervals along the additive path process according to the present invention calculation technique.

FIGS. 6A and 6B shows the results of the laser power prediction method being applied to a hollow cylinder 61. FIG. 6A depicts a simplified deposition path 60 utilized when building a cylinder structure 61 using additive laser deposition. The predicted power shown in graph 62 of FIG. 6B is very smooth compared to the case described in FIGS. 5A and 5B. This is because the helical path 60 shown in FIG. 6A is much closer to a steady state than the raster path 50 used in the rectangular solid of FIG. 5A. The inventive power prediction method is merely bringing the part up to temperature and settling into a near-steady state.

With the foregoing explanation, it will be appreciated that in one embodiment the inventive method is a power schedule calculation method for an additive deposition process using a beam source that calculates optimum beam power for any point P(s) along an additive path that will be traveled to form a build, the build having a geometry and being formed from deposited material added to a structure, the point P(s) along the additive path having associated with it an idealized geometry comprising a melt pool, hot zone and bulk portion.

Figure 8A:
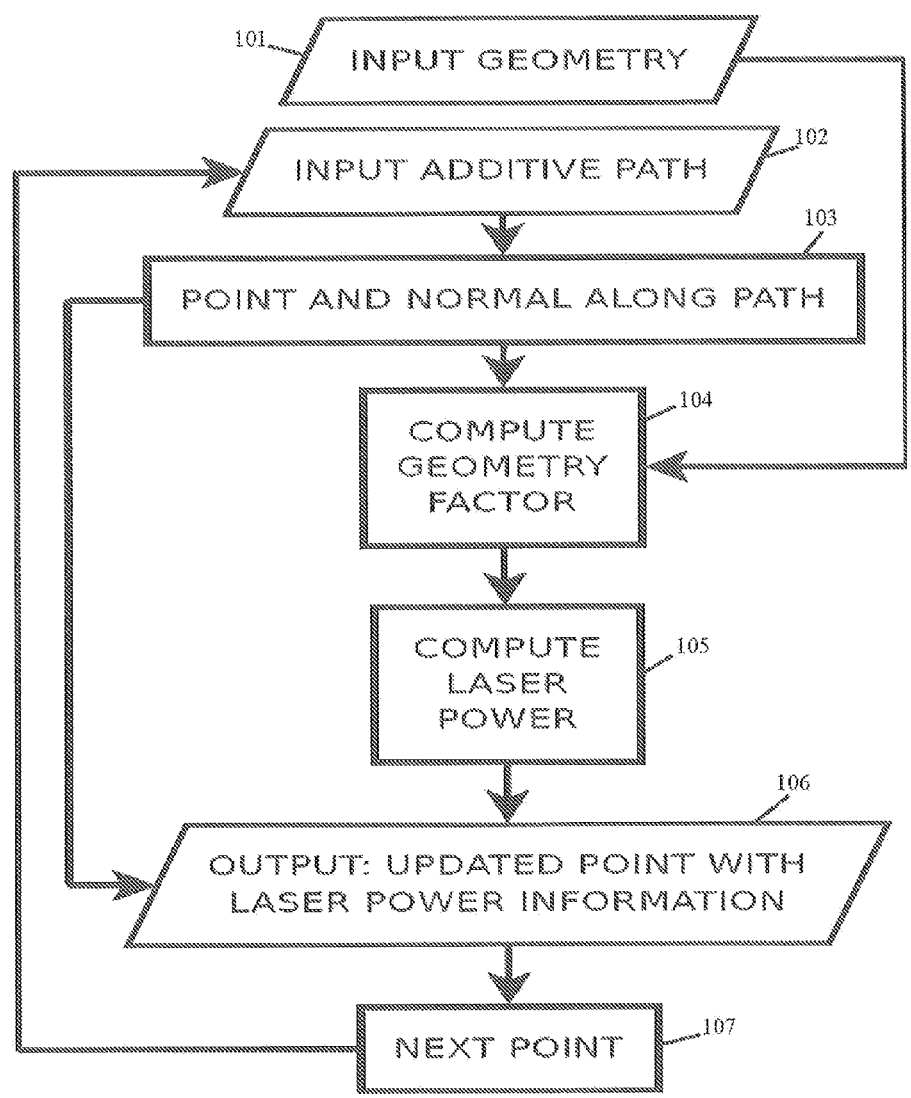
FIGS. 8A-8C are flow charts of an embodiment of the method for controlling beam power according to the present invention predictive technique.
Figure 8B:
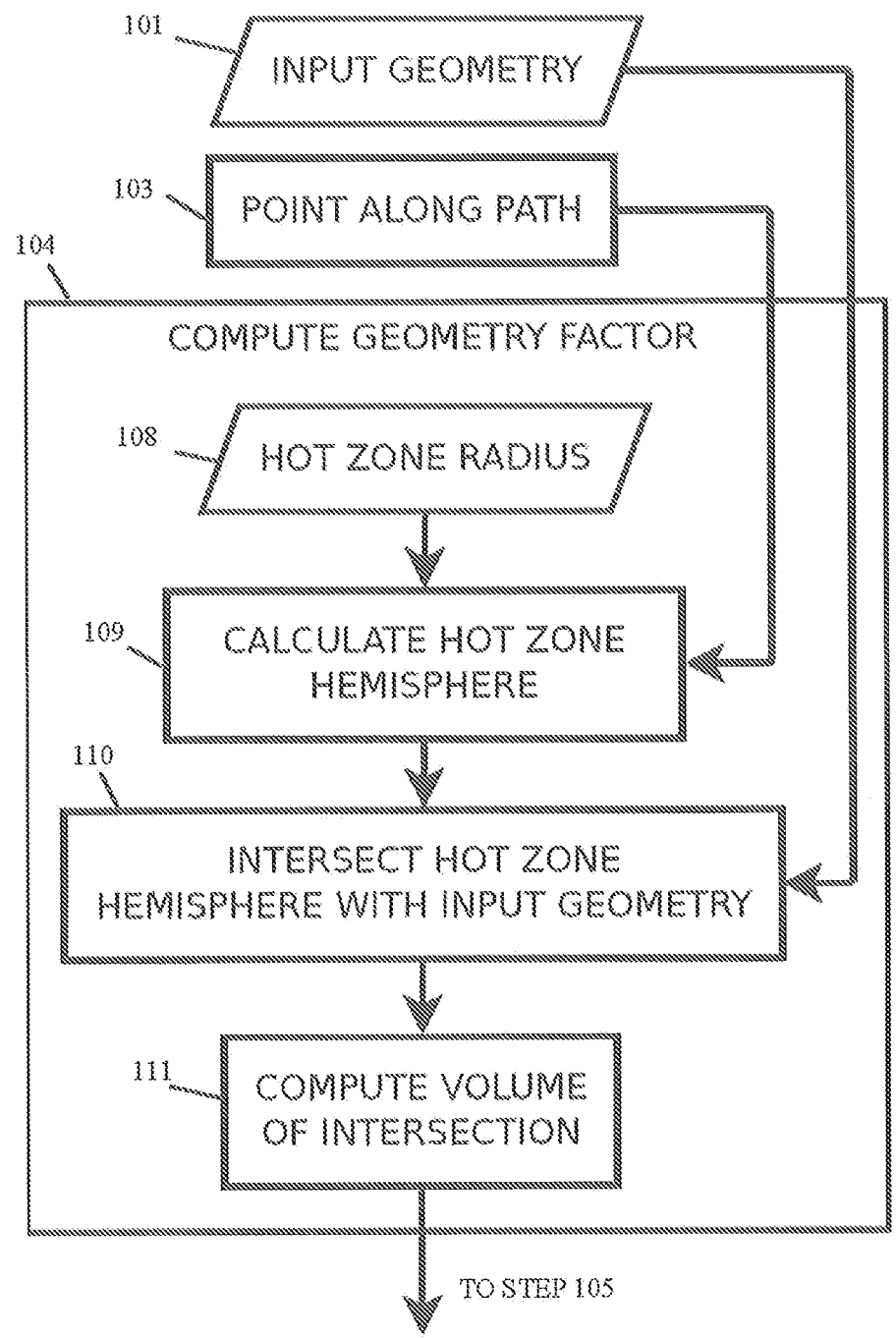
Figure 8C:
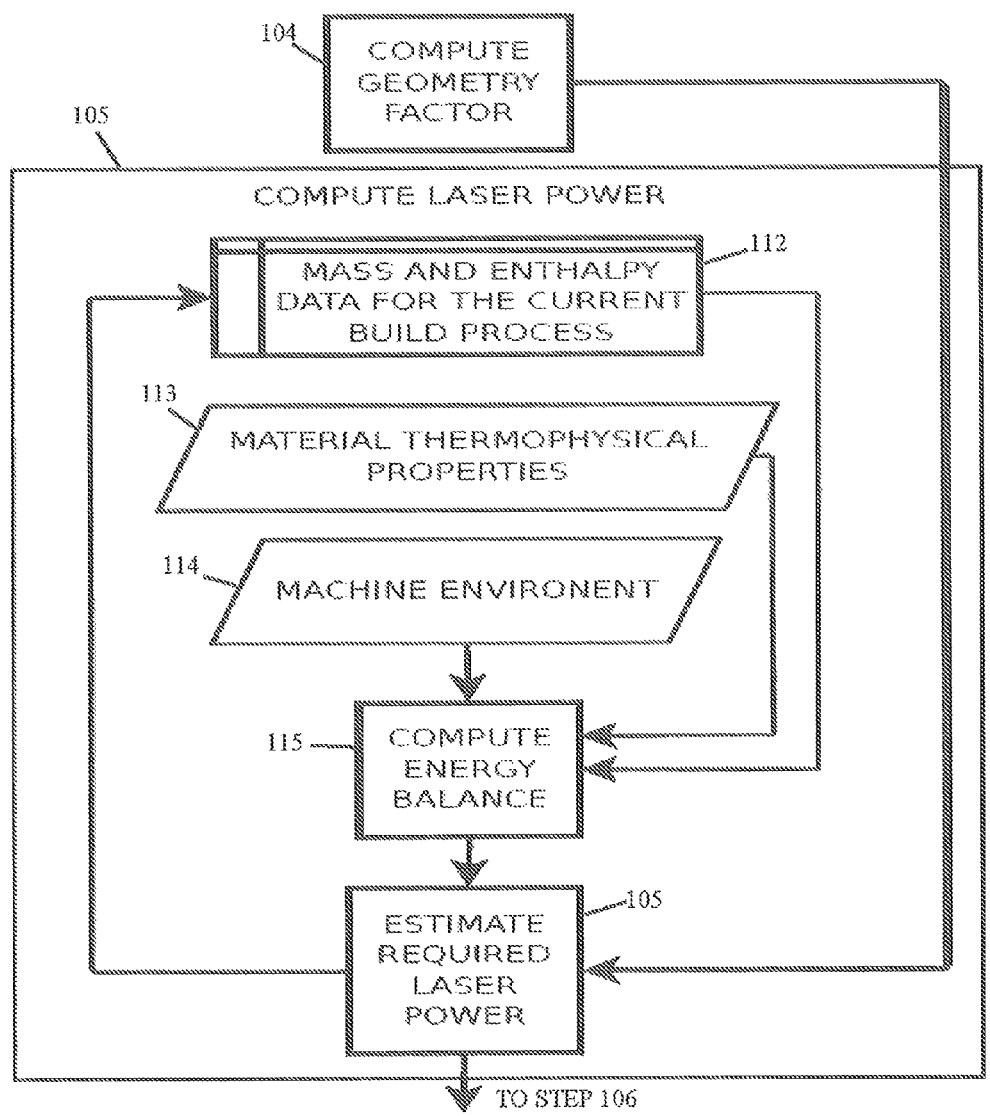

FIGS. 8A-8C are flowchart representations of an embodiment of the present invention method. As shown in FIG. 8A, a first step 101 is the input of geometry parameters. A second step 102 includes the input of additive path data. The third stage 103 involves the selection of the point on the path for which power should be predicted. Stage 3 corresponds to equation no. 29 in the above calculations. The fourth step is computing the geometry factor, which process is explained in more detail in FIG. 8B. At the fifth stage 105, the required laser power for the particular point on the additive path is determined. This fifth stage 105 is explained in more detail in FIG. 8C. Having computed laser power for the point, the updated point with laser power information is used as an output 106 to control the laser. The process the repeats at step 107 for the next point on the additive path.

As shown in FIG. 8B, the input geometry 101 and selected point 103 are used to compute the geometry factor of step 104. This geometry factor is computed according to equations nos. 11-12 in the above equations. In this respect, the selected path point 103 and input as to the hot zone radius 108 is used to calculate a hot zone hemisphere at 109. Calculation 109 is used along with the input geometry data 101 to mathematically model an intersection of the hot zone hemisphere on the build at the selected point at step 110. With this model of step 110 the volume of the intersection of the hot zone hemisphere is computed at step 111.

With step 111 completed, the geometry factor computation 104 is completed and the calculation proceeds to compute laser power at step 105. FIG. 8C depicts the step components of the laser power computation step 105. As shown in FIG. 8C an energy balance is computed 115 based upon a preceding computation 112 and data inputs 113, 114. Computation step 112 determines the mass and enthalpy data for the current build process 112. Step 112 corresponds to equation nos. 20-28 in the above equations. Input 113 relates to material thermophysical properties. Input 114 is the machine environment. The computed energy balance 115 is achieved via equations nos. 13-15 of the above equations. The computed energy balance 115 and the computed geometry factor 104 are then used to estimate required laser power 10S (equations nos. 16-19) at the path point.

Having explained the method mathematically, the inventive method can be verbally summarized and described In summary description, the method comprises creating a geometric description representing the geometry of the build during the additive process and creating a path description that represents the path of the beam source through space during the additive process. The method further includes calculating the idealized geometry for a point P(s) on the additive path based upon the geometric description and path description. In addition, the method includes calculating an energy balance at the melt pool ($EB_{melt\ pool}$) for the point P(s) on the additive path, the energy balance calculation being based upon the following calculations;

a) a calculation of energy radiated from the melt pool ($H_{rad}$);

b) a calculation of energy conducted from the melt pool to the hot zone ($H_{cond}$), the calculation of $H_{cond}$ being based upon the calculated idealized geometry and c) a calculation of energy lost due to convection at the melt pool ($H_{conv}$);

The method further includes calculating total energy ($H_{total}$) needed at the point P(s) on the additive path according to the following equation $$H_{total} = H_{deposited\ material} + H_{remelt} + EB_{melt\ pool}$$

wherein $H_{deposited\ material}$ represents energy required to melt the deposited material and $H_{remelt}$ represents energy required to remelt existing material; and The last step of the first embodiment of the inventive method includes calculating optimum beam source power $Q_{source}$ for the point P(s) according to the following equation $$Q_{source} = \min(Q_{max}, H_{total}/\alpha\Delta t)$$

wherein $Q_{max}$ represent maximimi laser power, α represents a beam absorption coefficient and Δt represents a calculation interval.

The first embodiment inventive method can be refined further by enhancing the calculation of the idealized geometry by calculating a geometry index hot zone volume ($V_{hot}$) for the point P(s) on the additive path according to the formula $$V_{hot} = G \cap Z(r_{hot}, P(s), t'(s))$$

wherein G represents deposition geometry, Z represents a hemisphere of a certain radius (r) and having a circular surface centered at a point P(s) on the additive path with a normal direction (n̂), $r_{hot}$ represents the radius of the hot zone and t'(s) represents tool axis direction at a distance s along the additive path; and calculating a geometry index hot zone area ($A_{hot}$) for the point P(s) on the additive path based upon the calculated geometry Index hot zone volume ($V_{hot}$) according to the formula $$A_{hot} = V_{hot} A_{max}/V_{max}$$

wherein $A_{max}$ represents the maximum area of the hot zone and $V_{max}$ represents the maximum volume of the hot zone The first embodiment inventive method can be refined further by calculating $EB_{melt\ pool}$ according to the formula $$EB_{melt\ pool} = H_{rad} + H_{cond} + H_{conv}$$

In another embodiment, the invention is directed to a power schedule calculation method for an additive deposition process using a beam source that calculates optimum beam power for any point P(s) along an additive path that will be traveled to form a build, the build having a geometry and being formed from deposited material added to a structure, the point P(s) along the additive path having associated with it an idealized geometry comprising a melt pool, hot zone and bulk portion. This method comprises creating a build geometry description based upon data representing the geometry of the build during the additive process and creating a path description based upon data, representing the path of the beam source through space during the additive process. The method also involves calculating the mass of the build at a point P(s) during the additive process that accounts for accretion of the build during the additive process and calculating the idealized geometry at point P(s) during the additive process, the idealized geometry calculation calculates the size of the melt pool, hot zone and bulk portion. Additionally, the method involves calculating the temperature of the build at point P(s) during the additive process, the calculation of the temperature of the build includes a calculation of hot zone temperature based upon the idealized geometry.

The second embodiment method further comprises calculating an energy loss of the build at point P(s) during the additive process, the calculation of energy loss being based upon the calculation of temperature and including a calculation of energy conducted from the melt pool to the hot zone; calculating an enthalpy of the build at point P(s) in time during the additive process; calculating total energy needed at the point P(s) based upon the calculated energy loss and enthalpy of the build at point P(s) on the additive path; and calculating an optimum beam source power based upon the calculation of total energy needed.

Figure 7:
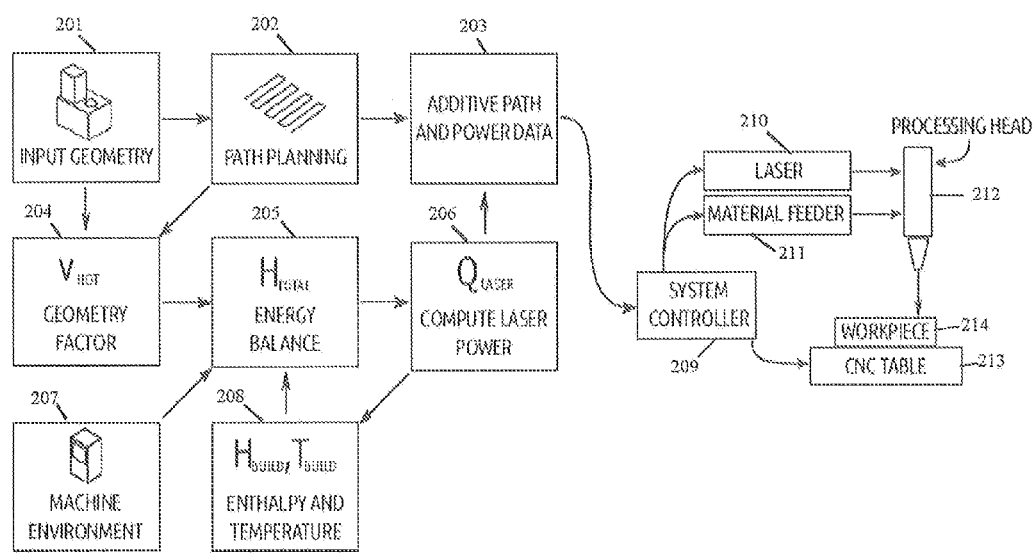
FIG. 7 depicts a preferred embodiment system for fabricating a part on a substrate using a deposition beam source that follows an additive path and that is controlled in accordance with the described laser power prediction method.

Using the calculations above, the laser energy delivered during an additive path deposition process can be controlled for each point along the path by regulating power to the laser at each point in accordance with the required power predicted by the above calculation methods. As such, in another embodiment of the invention the method can be programmed into a computer-controlled laser metal deposition system to improve the fabrication of component of almost any geometry that can be produced from a computer database. This system for fabricating a part on a substrate using a deposition beam source that follows an additive path is depicted in FIG. 7. The system includes a computer-aided design database including a description of the part to be fabricated and a database describing the additive path to be traveled as the part is formed. The additive path is composed of a plurality of points. The system further includes a substrate support (CNC table) 213 for supporting the workpiece (substrate) 214 and manipulating it through space, a material feeder 211 (a metal stock delivery system such as a powdered metal injector/sprayer or wire feeder) and a laser 210, a system controller 209 and a processing head 212. Laser 210, system controller 209 and processing head 212 work together to emit a beam (arrow impacting workpiece) onto workpiece 214 and form a melt pool thereon and control power to the beam source. System controller 209 is programmed to regulate energy of the produced beam for any point on the additive path in accordance with the required power predicted by the above calculation methods. System controller 209 regulates power to laser 210 for each point on the additive path as a function of input data shown in FIG. 7. These inputs are used to produce an overall additive path and power data input 203 for the system controller. The additive path component of this input is based upon the geometry of the workpiece to be built 201 and a description of the planned path to be followed during the laser deposition process 202. Data elements 201 and 202 are also used to compute a predicted required power level and are used as inputs to compute a hot zone volume geometry factor 204 for the point on the path. Data 204 is an input along with machine environment data 207 and enthalpy and temperature data 205 that is used to compute energy balance 205 calculated for the point during the process. Element 205 is used to compute needed laser power 206. As the deposition process is additive and the formula recursive, computed laser power 206 is also a data element that factors into enthalpy and temperature data 208.

The process described herein can also be used in connection with other traditional welding techniques, such as tungsten inert gas ("TIG") welding, gas metal are welding ("GMAW"), plasma transferred are ("PTA") welding and electron beam ("EB") welding. While the embodiments of the method and system of the present invention have been described herein, numerous modifications, alterations and changes to the described embodiments are possible without departing from the scope of the invention. The embodiments described herein are not intended to be limiting.

What is claimed is:

1. A power schedule calculation method for an additive deposition process using a beam source that calculates optimum beam power for any point P(s) along an additive path that will be traveled to form a build, the build having a geometry and being formed from deposited material added to a structure, the point P(s) along the additive path having associated with it an idealized geometry comprising a melt pool, hot zone and bulk portion, the method comprising:
   1) creating a geometric description representing the geometry of the build during the additive process;
   2) creating a path description that represents the path of the beam source through space during the additive process;
   3) calculating the idealized geometry for the point P(s) on the additive path based upon the geometric description and path description;
   4) calculating an energy balance at the melt pool ($EB_{melt\ pool}$) for the point P(s) on the additive path, the energy balance calculation being based upon the following calculations:
      a) a calculation of energy radiated from the melt pool ($H_{rad}$);
      b) a calculation of energy conducted from the melt pool to the hot zone ($H_{cond}$), the calculation of $H_{cond}$ being based upon the calculated idealized geometry and
      c) a calculation of energy lost due to convection at the melt pool ($H_{conv}$);
   5) calculating total energy ($H_{total}$) needed at the point P(s) on the additive path according to the following equation $$H_{total}=H_{deposited\ material}+H_{remelt}+EB_{melt\ pool}$$

wherein $H_{deposited\ material}$ represents energy required to melt the deposited material and $H_{remelt}$ represents energy required to remelt existing material;
   6) calculating optimum beam source power $Q_{source}$ for the point P(s) according to the following equation $$Q_{source}=\min(Q_{max},H_{total}/\alpha\Delta t)$$

wherein Qmax represent maximum laser power, $\alpha$ represents a beam absorption coefficient and $\Delta t$ represents a calculation interval.

2. The method of claim 1 wherein calculating an idealized geometry includes:
   calculating an geometry index hot zone volume ($V_{hot}$) for the point P(s) on the additive path according to the formula $$V_{hot}=G\cap Z(r_{hot},P(s),t'(s))$$

wherein G represents deposition geometry, Z represents a hemisphere of a certain radius (r) and having a circular surface centered at a point P(s) on the additive path with a normal, direction ($\hat{n}$), $r_{hot}$ represents the radius of the hot zone and t'(s) represents tool axis direction at a distance s along the additive path; and
   calculating a geometry index hot zone area ($A_{hot}$) for the point P(s) on the additive path based upon the calculated geometry index hot zone volume ($V_{hot}$) according to the formula $$A_{hot}=V_{hot}A_{max}/V_{max}$$

wherein $A_{max}$ represents the maximum area of the hot zone and $V_{max}$ represents the maximum volume of the hot zone.

3. The method of claim 2 wherein calculating $EB_{melt\ pool}$ is performed according to the formula $$EB_{melt\ pool}=H_{rad}+H_{cond}+H_{conv}.$$

4. A power schedule calculation method for an additive deposition process using a beam source that calculates optimum beam power for any point P(s) along an additive path that will be traveled to form a build, the build having a geometry and being formed from deposited material added to a structure, the point P(s) along the additive path having associated with it an idealized geometry comprising a melt pool, hot zone and bulk portion, the method comprising;
   creating a build geometry description based upon data representing the geometry of the build during the additive process;
   creating a path description based upon data representing the path of the beam source through space during the additive process;
   calculating the mass of the build at point P(s) during the additive process that accounts for accretion of the build during the additive process;
   calculating the idealized geometry at point P(s) during the additive process, the idealized geometry calculation calculating the size of the melt pool, hot zone and bulk portion;
   calculating the temperature of the build at point P(s) during the additive process, the calculation of the temperature of the build including a calculation of hot zone temperature based upon the idealized geometry;
   calculating an energy loss of the build at point P(s) during the additive process, the calculation of energy loss being based upon the calculation of temperature and including a calculation of energy conducted from the melt pool to the hot zone;
   calculating an enthalpy of the build at point P(s) in time during the additive process;
   calculating total energy needed at the point P(s) based upon the calculated energy loss and enthalpy of the build at point P(s) on the additive path; and
   calculating an optimum beam source power based upon the calculation of total energy needed.

5. A method of controlling beam power during an additive deposition process employing a beam source using a power schedule calculation that calculates optimum beam power for any point P(s) along an additive path that will be traveled to form a build, the build having a geometry and being formed from deposited material added to a structure, the point P(s) along the additive path having associated with it an idealized geometry comprising a melt pool, hot zone and bulk portion, the method comprising:
   creating a build geometry description based upon data representing the geometry of the build during the additive process;
   creating a path description based upon data representing the path of the beam source through space during the additive process;
   calculating the mass of the build at point P(s) during the additive process that accounts for accretion of the build during the additive process;
   calculating the idealized geometry at point P(s) during the additive process, the idealized geometry calculation calculating the size of the melt pooh hot zone and bulk portion;
   calculating the temperature of the build at point P(s) during the additive process, the calculation of the temperature of the build including a calculation of hot zone temperature based upon the idealized geometry;

calculating an energy loss of the build at point P(s) during the additive process, the calculation of energy loss being based upon the calculation of temperature and including a calculation of energy conducted from the melt pool to the hot zone;

calculating an enthalpy of the build at point P(s) in time during the additive process;

calculating total energy needed at the point P(s) based upon the calculated energy loss and enthalpy of the build at point P(s) on the additive path;

calculating an optimum beam source power based upon the calculation of total energy needed at point P(s) during the additive process; and modulating the power of the beam emitted by the beam source at point P(s) of the additive path in accordance with the optimum beam source power calculated for point P(s).

6. A system for fabricating a part on a substrate using a deposition beam source that emits a beam that follows an additive path composed of a plurality of points, the system comprising:

a substrate support for supporting the substrate and manipulating it through space;

a metal stock delivery system;

a controllable beam source capable of emitting a beam onto the substrate and adapted to form a melt pool thereon; and a controller adapted to control power to the beam source, the controller programmed to regulate energy of the produced beam for any point on the additive path in accordance with the required power predicted by any of the methods of claims 1-5.

* * * * *